No. 829,700. PATENTED AUG. 28, 1906.
M. DREES.
GAS PURIFYING APPARATUS.
APPLICATION FILED FEB. 20, 1905.
2 SHEETS—SHEET 1.
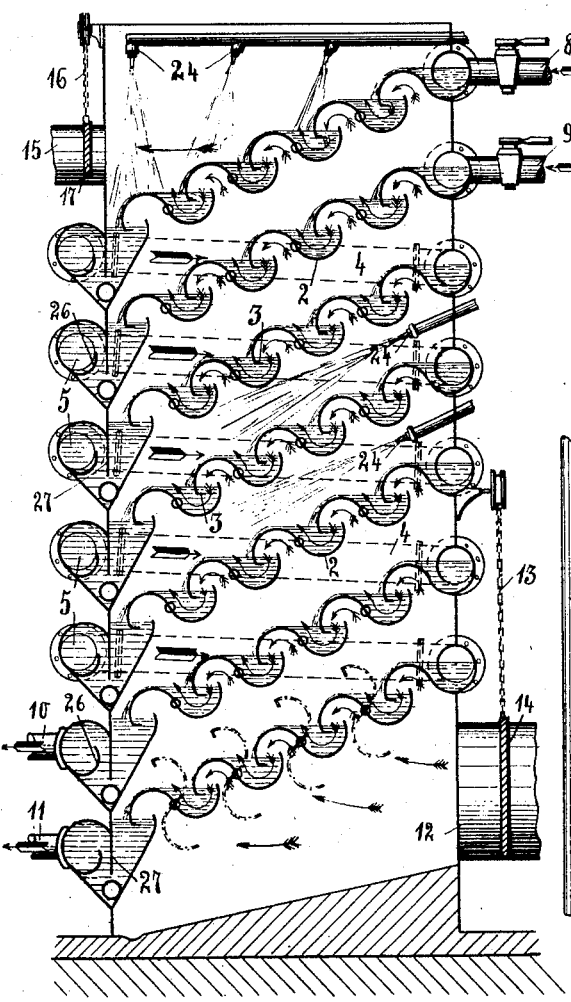
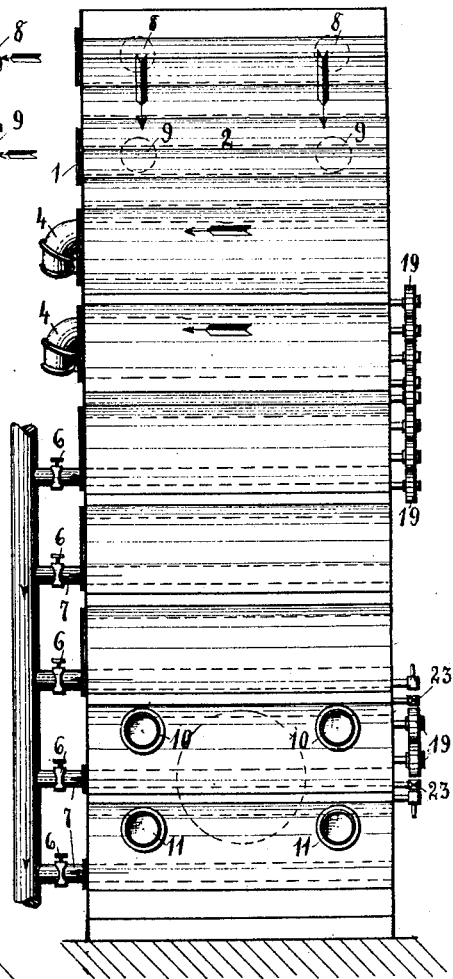
Witnesses:
P. F. Nagle.
L. Douville.
Inventor:
Michel Drees.
By Diedersheim & Fairbanks,
Attorneys.

No. 829,700. PATENTED AUG. 28, 1906.
M. DREES.
GAS PURIFYING APPARATUS.
APPLICATION FILED FEB. 20, 1905.
2 SHEETS—SHEET 2.
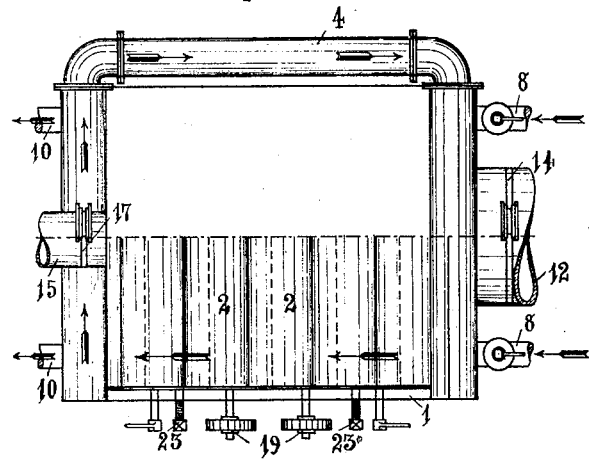
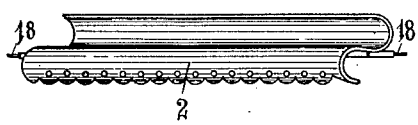
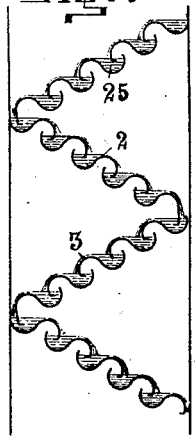
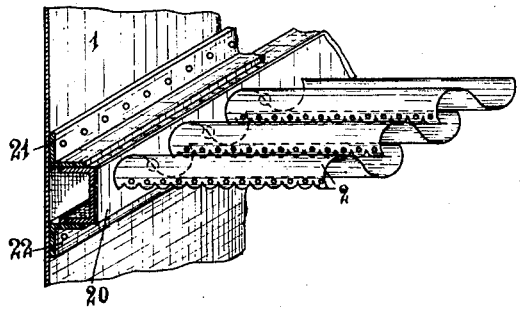
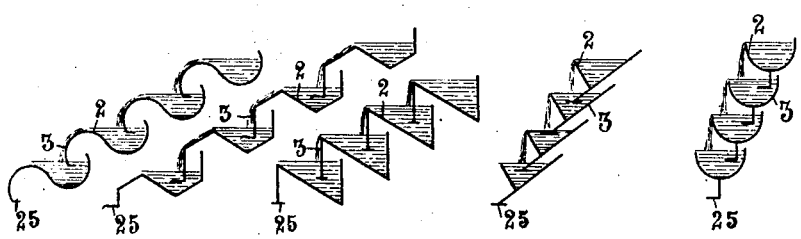
Witnesses:
P. F. Nagle
C. S. McVay
Inventor
Michel Drees
By Diedersheim & Fairbanks
Attorneys.

UNITED STATES PATENT OFFICE.

MICHEL DREES, OF APLERBECK, GERMANY.

GAS-PURIFYING APPARATUS.

No. 829,700.　　　Specification of Letters Patent.　　　Patented Aug. 28, 1906.

Application filed February 20, 1905. Serial No. 246,417.

*To all whom it may concern:*

Be it known that I, MICHEL DREES, engineer, a citizen of the Grand Duchy of Luxemburg, and a resident of 10 Markt, Aplerbeck, Germany, have invented certain new and useful Improvements in and Relating to Gas-Purifying Apparatus Applicable for other Purposes, of which the following is a specification.

Appliances as hitherto used for separating dust, water, or similar admixtures from gases for the condensation of vapors, for the absorption of gases for the concentration of lyes and brines for cooling, and especially for the mutual direct reaction of gases and liquids are based for the most part upon the arrangement in series of liquid seals through which the gases are positively obliged to pass. The penetration of a number of such liquid seals one after another renders it necessary to exert a correspondingly high suction or pressure action upon the gases.

This invention has for its object an apparatus for attaining the said purpose which by the arrangement in groups of liquid seals side by side which are intended to be traversed by the gas in a parallel stream insures very vigorous contact of the gas with the liquid, and consequently a very far-reaching interaction between the two without, however, necessitating an accumulation of the separate resistances to such a point that the counter-pressure becomes inadmissible.

The invention is illustrated in the accompanying drawings, in which—

Figures 1 to 3 illustrate an apparatus in accordance with the invention and which for the sake of brevity may be termed a "gas-scrubber," although it should of course be understood that with suitable modifications it may be used for the purposes enumerated above and the like. Fig. 1 is a vertical section through the apparatus transversely to the seal-channels. Fig. 2 is an elevation of the same in the direction of the seal-channels. Fig. 3 is a plan view showing a portion of the interior of the box-like casing. Fig. 4 shows a constructional form of channel in perspective, the seal or immersion wall being represented separately. Fig. 5 shows by way of example several constructional forms of seal-channels intended to be arranged one after the other. Fig. 6 shows a convenient and adjustable packing for interposition between the ends of the channels and the walls of the casing. Fig. 7 illustrates the most simple manner of arranging in series such group of liquid seals, so as to form a closed system.

The principle of the invention is hereinafter fully described with reference to the constructional example given in the drawings.

In a box preferably rectangular in plan there are arranged in such a manner as to be either fixed or rotatable and in planes inclined in correspondence with the desired velocity of the liquid the overflow-channels 2, which are themselves horizontal and which at the same time serve as reservoir and as immersion-wall of the liquid seal to be formed in such manner that projections or prolongations 3 of the upper channels invariably extend below the lower seal-level. The dam or reservoir and seal resistance of any of the constructional forms illustrated which as regards their action are of equivalent value are united, so as to form one piece, or the series may be formed of one piece. A step-like channel plane of this kind provided with liquid therefore forms a resistance or liquid seal of an absolutely definite cross-section and of either predetermined or adjustable resistance inside the shaft-like casing. The most obvious plan is to join a stepwise arrangement of channels descending, say, from left to right to another, the inclination of which is from right to left, in such a manner that the liquid travels downward in a zigzag path inside a single casing. (See Fig. 7.) It will be clearly seen from the diagrammatic view that this solution of the problem is not a good one as regards the best utilization of space, while it is inefficient when the height of the structure is restricted.

The system illustrated in Fig. 1 fulfils the purpose better, the stepwise arrangement of channels which are arranged in parallel one beneath the other being connected with transfer or circulation pipes 4 or similar means situated outside the casing and which for the purpose of causing as little loss of level or head as possible are given the smallest permissible inclination. With this arrangement it is readily possible to insert a number of such positive stepwise channel-paths for the liquid one within the other. This is shown in Fig. 1 as regards two such paths. Space is much better utilized by this means, and, further, the possibility is afforded of bringing the gases alternately into contact with two or more different liquids by causing the paths for the liquid which are independent one of the other to be traversed by different liquids.

If it is desired to avoid even the small loss of head which takes place with repeated reconduction to one and the same side of the apparatus, it is possible to arrange two apparatuses of this kind in such a manner that one of them forms, so to speak, reversed or reflected image of the other, the reconduction then taking place with utilization of the height of fall.

At the places at which the serpentine path which is given in all arrangements for the descending liquid is reversed a collector-reservoir 5 is provided and is preferably formed as a separator for the mud, tar, and other solid deposits or secretions of all kinds from the liquid. By means of the cocks 6 and of mud blow-outs 7, which are adapted to be cut off, it is possible to withdraw the solid or liquid substances separated as and when desired.

As shown in the drawings, the separator is inserted at a point which is not placed in constant movement by the passage of the gas. The separation is therefore largely facilitated, owing to the relative tranquillity of the liquid. The gas penetrates only the liquid seals arranged inside the casing in series without having to pass through the mud-separator arranged outside. The liquid passes through the cocks 8 and 9 into the channel, fills the liquid seals, and flows cascade-fashion over the front rounded lip or edge of the channels, serving as overflow from channel to channel, so that its velocity is again retarded. It then passes through the separator 5, is reconducted to the other side, and after the path described has been traversed the desired number of times it issues at 10 and 11. A free descent or head of the liquid with its unfavorable effects is therefore obviated or at least greatly restricted.

The gas enters the lower part of the box-like casing 1 through the conduit 12, the available cross-section of which is adapted to be varied or entirely obturated by means of the valve 14, suspended on the chain 13. It passes through the liquid seals in the direction indicated by the arrows and leaves the casing at its upper part through the opening 15, which may be adjusted or closed by another valve 17, actuated by means of a chain 16. The gas may also follow the reverse path; but in most cases this is less efficient. As the gas in its ascent in the seal itself moves with the water, both the displacement forces unite to convey the mud and other separated substances from overflow to overflow until they are retained in the mud-collectors 5.

By appropriately regulating the supply of liquid so as to send intermittent cascade waves through the apparatus this effect may be largely increased. The interaction between the gas and liquid may also be facilitated by the displacement of the gas. The gas is driven through the apparatus by suction or pressure. This force may be exerted intermittently—for example, the gas under pressure or the compressed steam actuating the injector or exhauster may be throttled or cut off at regular intervals by known distributing devices, so that the gas proceeds intermittently, thereby imparting to the liquid filling the seal-channels a wave-like movement. At the same time the shocks so produced themselves favorably affect the purifying effect of this apparatus.

The channel-bodies 2, which at the same time constitute the reservoir and immersion wall, which bodies may be of any form corresponding to the cross-sections illustrated, engage one in the other in such a manner that the lower branch or projection 3 extends below the sea-level defined by the height of the overflow edge of the other. The equivalent cross-sectional formation relatively to the axis of the reservoir and of the overflow—say such as is given by the S and Z form illustrated—presents practical advantages, but is in no way essential. The path for the liquid is a perfectly determined one and a free fall is excluded, so that the conduction of the mud into the collecting vessel is fully insured.

By mounting the channels 2 in such a manner that they are rotatable around pins 18, situated in their axis, it is possible to regulate the depth of immersion, and consequently the resistance. This adjustment may be effected simultaneously by positively coupling the pins 18, for example, by means of link-motion of the parallelogram kind or by means of pinions 19, mounted on the pivots 18, and actuated simultaneously by means of a rack, chain, worm-gear, or the like. By rotating the channels through an angle of ninety degrees it is possible to cleanse the entire apparatus very readily, and this is made still more efficient by simultaneous spraying. In the purification of furnace-gases containing a large amount of dust this is of great importance. The manufacture of the channels themselves is exceedingly simple. They may be formed of sheet metal or of wood. The employment of lead-covered channels in the case of sulfuric acid and of channels of enameled or glazed earthenware or chamotte for lyes and acids is a purely technical measure. The same is true of the packing against the parallel walls of the casing 1, which may be effected by means of metal, india-rubber, felt or cork disks, or of linen pockets, the only point to be considered being the superiority of one or other of these materials for the purpose in view.

Fig. 6 shows an advantageous constructional form of an adjustable packing of this kind. The pivots 18 of the channels 2 of a stepwise series of channels are mounted in holes in the J-shaped iron bar 20 or some similar part running in the plane of the series, this iron bar being displaceably mounted between the angle-irons 21 and 22, permanently fixed on the wall of the casing 1. By means of the set-screws 23 the U-shaped bar may be pressed against the flat extremities of the seal-channels 2, the side of its web portion which is covered with some suitable material making a tight joint. Upon slackening the screws 23 the pressure is removed and the channels 2 are rendered adjustable. Of course it is only necessary to provide this adjustable packing or joint upon one side.

If it should appear desirable that the gas should be permeated by the liquid in the form of a spray, there may be arranged within the spaces delimited by the stepwise series of channels spraying-nozzles 24 or similar spraying or atomizing means. Further, the channels themselves may be adjusted by means of the positive connection of their pivots, which has already been referred to, in such a manner that without detriment to the principal characteristic action a portion of the liquid may fall over the inner edge of the seal, and thus cause a spraying action. It is also possible to adjust the channels in such a manner that no immersion of the gases takes place, but only a passage over succeeding surfaces and a spraying owing to the cascade-like overflow from channel to channel.

The channels themselves may vary largely in construction, so as to adapt them for many different purposes. For example, they may present the form illustrated in Fig. 4. In this construction the longitudinal edge of the channel which constitutes the immersion-wall is bent in, notched, and perforated in such a manner that the varying hydrostatic pressure also finely divides the gases in the longitudinal direction. In order to give a long positive path for the gases through the liquid seals, the immersion-wall is preferably provided with a horizontal projection 25, which obliges the gases to remain in contact with the liquid for a longer time. This projection may also be formed by a flexible or displaceably-mounted material—such, for example, as linen, fibrous material, basket-work, india-rubber, or the like—which is caused to float, owing to buoyancy in the water, while owing to the shocks produced by the gas and the intermittent passage of the water it is constantly in movement, and so facilitates the regulation of the hydrostatic pressure.

Inside the collector 5 there are arranged the overflow-channels 26, which are intended to prevent the mud deposited there from reaching the overflow-pipes 4. Likewise the vertical depending walls 27 serve to prevent the propagation of the eddies produced by the admission of the liquid into the reservoir 5.

It is not essential that the form of the apparatus should be rectangular in plan, and apparatus in accordance with this invention might also be constructed with a circular base and concentric rings of channels or in the form of closed polygons superposed one upon the other in the form of cones or pyramids and properly supported.

The field for the employment of this apparatus extends beyond what has been stated above. Thus, for example, it may be used for freezing steam out of gases and out of air for drying purposes, also for the preliminary heating or vaporization of water by means of hot gases, (utilization of waste heat.) The extended surfaces over which liquid flows and the large number of damming reservoirs produce an increased exchange of temperature. The apparatus is likewise adapted for use in the manner of the known appliances for separating oil from exhaust-steam.

Ores in finely-divided or in granular form may also be roasted in the apparatus by an analogous operation.

Having now particularly described and ascertained the nature of my said invention and in what manner the same is to be performed, I declare that what I claim is—

1. Apparatus for mutually and directly acting upon gases and liquids, with gas-currents conducted positively through liquid seals by means of seal or immersion channels arranged at an inclination step-fashion and overlapping each other in the manner of shutters, the upper part of each such channel forming the damming-reservoir for the adjacent upper channel, while its lower addition or prolongation enters the next adjacent lower channel.

2. Apparatus for mutually and directly acting upon gases and liquids, with gas-currents conducted positively through liquid seals by means of seal or immersion channels arranged at an inclination stepwise and overlapping each other in the manner of shutters, the upper part of each such channel forming the reservoir for the next adjacent upper channel, while its lower addition or prolongation enters the next lower channel as immersion-wall and with a similar set of channels of opposite inclination connected with the said set for the purpose of arranging the separate groups in series.

3. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above while its lower addition or prolongation enters the next lower channel as immersion-wall, and with transfer or circulation pipes situated outside the casing or similar means from the end of one series of channels to the beginning of the next series of channels parallel therewith.

4. Apparatus for mutually and directly acting upon gases and liquids, with gas-currents conducted positively through liquid seals by means of seal or immersion channels arranged stepwise and overlapping each other in the manner of shutters the upper part of each of such channels forming the reservoir for the channel next above while its lower addition or prolongation engages an immersion-wall in the next lower channel, and with transfer or circulation pipes situated outside the casing from the end of one series of channels to the beginning of the next series parallel therewith and with a number of similarly-formed separate paths for the liquids inserted one within the other.

5. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above, while its lower addition or prolongation engages as immersion-wall in the next lower channel, and means for rotating said channels.

6. Apparatus for mutually and directly acting upon gases and liquids with gas-currents conducted positively through liquid seals by means of seal or immersion channels arranged stepwise and overlapping each other in the manner of shutters, the upper part of each such channel forming the reservoir for the channel next above while its lower addition or prolongation engages as immersion-wall in the next lower channel, and with collector-reservoirs at the end of each series of channels serving as mud-separators.

7. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above while its lower addition or prolongation engages as immersion-wall in the next lower channel, and with mud-separators at the end of each series of channels and provided with blow-off mudcocks.

8. Apparatus for mutually and directly acting upon gases and liquids, with gas-currents conducted positively through liquid seals and with seal or immersion channels arranged in inclined planes and overlapping each other in the manner of shutters, the upper part of each of such channels forming the reservoir and its lower addition or prolongation forming the immersion-wall, for the channels next above and below respectively, with rotatable mounting of the separate channels around a longitudinal axis.

9. Apparatus for mutually and directly acting upon gases and liquids, with gas-currents conducted positively through liquid seals and with seal or immersion channels arranged in inclined planes and overlapping each other in the manner of shutters, the upper part of each such channel forming the reservoir and its lower addition or prolongation the immersion-wall for the channels next above and below respectively, with rotatable mounting of the separate channels around a longitudinal axis and with common, positive coupling of these pivots for the purpose of their simultaneous displacement.

10. Apparatus for mutually and directly acting upon gases and liquids, with gas-currents conducted positively through liquid seals, and with seal or immersion channels arranged in inclined planes and overlapping each other in the manner of shutters, the upper part of each such channel serving as a reservoir, and its lower addition or prolongation as immersion-wall for the channels next above and below respectively, with rotatable mounting of the separate channels around a longitudinal axis, and with common positive coupling of these pivots for the purpose of their simultaneous displacement, with adjustable packing through a bar of U-section or similar means arranged between suitable guides and adapted to be pressed against the ends of the channels with the interposition of some appropriate packing material, the pivots of the channels being mounted in this bar or the like.

11. Apparatus for mutually and directly acting upon gases and liquids, with gas-currents conducted positively through liquid seals by means of seal or immersion channels arranged stepwise and overlapping each other in the manner of shutters, the upper part of each such channel serving as reservoir for the channel next above while its lower addition or prolongation engages as immersion-wall, in the channel next below, and with notching of the lower prolongations, that is to say the immersion-walls.

12. Apparatus for mutually and directly acting upon gases and liquids with gas-currents conducted positively through liquid seals by means of seal or immersion channels arranged stepwise and overlapping each other in the manner of shutters, the upper part of each of such channels forming the reservoir for the channel next above, while its lower addition or prolongation engages as immersion-wall, in the next lower channel, and with perforations in the lower prolongation or immersion-wall.

13. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above, while its lower addition or prolongation engages as immersion-wall, in the next lower channel, and with a horizontal addition upon the lower prolongation serving as immersion-wall.

14. Apparatus for mutually and directly acting upon gases and liquids with gas-currents conducted positively through liquid seals by means of seal or immersion channels arranged stepwise and overlapping each other in the manner of shutters, the upper part of each of such channels forming the reservoir for the channel next above and its lower addition or prolongation engaging as immersion-wall in the next lower channel, and with an addition on this prolongation of flexible or displaceable material.

15. Apparatus for mutually and directly acting upon gases and liquids with gas-currents conducted positively through liquid seals by means of seals or immersion channels arranged stepwise and overlapping each other in the manner of shutters, the upper part of each such channel forming the reservoir for the channel next above, while its lower addition or prolongation engages as immersion-wall in the next lower channel, with circulating-pipes outside the casing from the end of one series of channels to the beginning of the next series of channels parallel therewith, spraying devices inside the chambers constituted by each pair of steps or series of channels.

16. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above, while its lower addition or prolongation engages as immersion-wall in the next lower channel, and with mud-separators at the end of each series of channels, with blow-off mud-cocks thereon, with gas admission and discharge apertures for the closed casing with slides therein and with liquid inlets and outlets adjustable by means of cocks.

17. Apparatus for mutually and directly acting upon gases and liquids, with gas-currents conducted positively through liquid seals by means of seal or immersion channels arranged stepwise and overlapping each other in the manner of shutters, the upper part of each such channel forming the reservoir for the channel next above while its lower addition or prolongation engages as immersion-wall in the next lower channel, and with mud-separators at the end of each series of channels, with blow-off mud-cocks thereon, with gas admission and discharge apertures for the closed casing with slides therein, and with liquid inlets and outlets adjustable by means of cocks, with rotatable mounting of the channels and common coupling of their pivots, adjustable packing by means of an iron bar, of U shape adapted to be pressed against the ends of the channels, or equivalent means.

Signed January 31, 1905.

MICHEL DREES.

Witnesses:
HARRY L. MEFFORD,
FRAU PFUDEL.